US012127315B2

(12) United States Patent
Yan et al.

(10) Patent No.: US 12,127,315 B2
(45) Date of Patent: Oct. 22, 2024

(54) HIGH-VOLTAGE WRGB STRING LIGHT

(71) Applicant: ZHEJIANG TWINSEL ELECTRONIC TECHNOLOGY CO., LTD., Ningbo (CN)

(72) Inventors: Jianping Yan, Ningbo (CN); Xueren Zeng, Ningbo (CN); Qian Xu, Ningbo (CN); Wei Yi, Ningbo (CN); Shiqing Xia, Ningbo (CN)

(73) Assignee: ZHEJIANG TWINSEL ELECTRONIC TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/311,507

(22) Filed: May 3, 2023

(65) Prior Publication Data

US 2024/0172342 A1 May 23, 2024

(30) Foreign Application Priority Data

Nov. 18, 2022 (CN) ........................ 202211448534.1

(51) Int. Cl.

| | |
|---|---|
| ***H05B 45/22*** | (2020.01) |
| ***F21S 4/10*** | (2016.01) |
| ***H05B 45/345*** | (2020.01) |
| ***H05B 45/37*** | (2020.01) |
| ***H05B 45/54*** | (2020.01) |

(52) U.S. Cl.

CPC ........... *H05B 45/22* (2020.01); *H05B 45/345* (2020.01); *H05B 45/37* (2020.01); *H05B 45/54* (2020.01); *F21S 4/10* (2016.01)

(58) Field of Classification Search

None

See application file for complete search history.

(56) References Cited

U.S. PATENT DOCUMENTS

| | | | | |
|---|---|---|---|---|
| 2004/0075401 A1* | 4/2004 | Segan | .................. | H05B 47/155 315/312 |
| 2010/0157588 A1 | 6/2010 | Tsai | | |
| 2015/0084515 A1* | 3/2015 | Altamura | ............... | H05B 45/20 315/131 |
| 2016/0113098 A1 | 4/2016 | Han | | |

(Continued)

FOREIGN PATENT DOCUMENTS

CN 113586988 A * 11/2021 ................ F21S 4/10

*Primary Examiner* — Anh Q Tran

(74) *Attorney, Agent, or Firm* — Hemisphere Law, PLLC; Zhigang Ma

(57) ABSTRACT

The present disclosure discloses a high-pressure white-red-green-blue (WRGB) string light, including a controller and a string light main body. The controller is connected with the string light main body; the string light main body is provided with a plurality of WRGB bulbs; the controller includes a first power supply module and a main control module; the first power supply module is adapted to be connected to a mains supply to supply power to the main control module; the WRGB bulbs include a second power supply module, an auxiliary control module and a lighting module; the second power supply module is adapted to be connected to the controller or the main supply to supply power to the auxiliary control module and the lighting module; and the main control module is adapted to send a control signal to the auxiliary control module.

9 Claims, 9 Drawing Sheets

(56) References Cited

U.S. PATENT DOCUMENTS

| | | | | |
|---|---|---|---|---|
| 2016/0143099 | A1 | 5/2016 | Ding | |
| 2022/0341576 | A1 * | 10/2022 | Leung | F21S 4/10 |
| 2023/0027092 | A1 * | 1/2023 | Zeng | F21V 23/003 |

* cited by examiner

HIGH-VOLTAGE WRGB STRING LIGHT

TECHNICAL FIELD

The present disclosure relates to the technical field of lighting lamps, specifically to a high-voltage white-red-green-blue (WRGB) string light.

BACKGROUND

A WRGB string light is a lamp formed by connecting in series a plurality of bulbs with WRGB LEDs. It is mainly used for decorative lighting. A lighting color can be adjusted, which can enhance the atmosphere. The WRGB string light is an indispensable decorative product in festival celebrations, cultural exchanges, cultural activities, night scene lighting of public places, and other scenes. Compared with a common RGB string light, the WRGB string light is brighter and has better light transmittance and lower power consumption.

However, the existing WRGB string light has the following defects: The number of serially connected strings in a low-voltage string light on the market is limited, and a voltage drop will be caused by an internal resistance of the string light, so the number of serially connected strings is generally less than four. If the number exceeds four, the brightnesses of the head and tail lights will be not uniform: The head light is high in brightness, but the tail light is low in brightness.

SUMMARY

One objective of the present disclosure is to provide a high-pressure white-red-green-blue (WRGB) string light that is convenient to control, has light sensation, timing, overcurrent protection and memory functions, and are formed by connecting a plurality of strings without attenuation.

In order to achieve the above objective, the technical solution adopted by the present disclosure is as follows: A high-pressure WRGB string light includes a controller and a string light main body; the controller is connected with the string light main body; the string light main body is provided with a plurality of WRGB bulbs; the controller includes a first power supply module and a main control module; the first power supply module is adapted to be connected to a mains supply to supply power to the main control module; the WRGB bulbs include a second power supply module, an auxiliary control module and a lighting module; the second power supply module is adapted to be connected to the controller or the main supply to supply power to the auxiliary control module and the lighting module; and the main control module is adapted to send a control signal to the auxiliary control module, so that the lighting module is turned on or turned off or switches a color.

As a preference, the controller further includes a light sensation and timing module; the light sensation and timing module is adapted to send a light sensation signal to the main control module by means of sensing an external light ray; and the main control module is adapted to receive the light sensation signal, and send the control signal instantly or later to turn on or turn off the WRGB bulbs.

As a preference, the controller further includes a protection module; the protection module is adapted to identify a current in the first power supply module, convert the current into a detection signal, and send the detection signal to the main control module; the main control module is adapted to receive and judge the detection signal; and the main control module is adapted to send, when the detection signal exceeds a preset value, the control signal to turn off the WRGB bulbs.

As a preference, the protection module includes a conversion circuit and a detection circuit; the detection signal includes a level signal; the conversion circuit is adapted to obtain the current of the first power supply module and convert the current into a voltage; the detection circuit is adapted to obtain the voltage at the conversion circuit, convert the voltage into the level signal, and send the level signal to the main control module; and the main control module is adapted to receive the level signal and judge a magnitude of the level signal.

As a preference, the conversion circuit includes a first conversion resistor and a second conversion resistor; the first conversion resistor and the second conversion resistor are connected in parallel to the first power supply module; and the detection circuit is adapted to obtain voltages at both ends of the first conversion resistor and the second conversion resistor.

As a preference, the controller further includes a switch module; the switch module is connected to the main control module, the first power supply module and the second power supply module; and when receiving the control signal, the switch module is adapted to switch off or switch on power supplied by the first power supply module to the second power supply module.

As a preference, a memory module is arranged on the main control module; the memory module is adapted to store a running state before power failure of the main control module; and the memory module is adapted to restore, after re-energization, the main control module to the running state before power failure.

As a preference, a first resistance-capacitance step-down circuit is arranged in the first power supply module; a second resistance-capacitance step-down circuit is arranged in the second power supply module; and the second resistance-capacitance step-down circuit is provided with a bridge rectifier for rectification.

As a preference, constant current circuits are arranged in the first power supply module and the second power supply module.

As a preference, the controller is provided with a first connector and a second connector; the string light main body is provided with a third connector; the first connector is adapted to be connected to a power supply; the third connector is adapted to be connected to the power supply; the second connector is adapted to be electrically connected to the third connector in a separable manner; the controller is provided with an indicator lamp; the indicator lamp is used for displaying an on/off state of the string light main body; the main control module is connected in parallel with a filter circuit; the main control module is provided with a first control pin, a second control pin, a detection pin, a light sensation pin and an indication pin; the first control pin is adapted to send the control signal; the main control module is connected with a color matching switch; the second control pin is adapted to receive a signal of the color matching switch; the detection pin is adapted to receive a detection signal; the light sensation pin is adapted to receive a light sensation signal; and the indication pin is adapted to send an indication signal to the indicator lamp.

Compared with the prior art, the present disclosure has the beneficial effects below:

1. The high-voltage WRGB string light is provided with the independently detachable controller. The string light main body can be directly connected to the mains supply to serve as an ordinary string light, and can also be connected to the controller to achieve turning on, turning off and color adjustment and switching. Four or more colors can be switched by using an alternating current mains frequency algorithm, and are highly synchronous. Due to the existence of the controller, such a defect can be avoided that the string light main body cannot be controlled because a remote controller is lost or there is no WIFI network. The controller and the string light main body can be directly connected to the mains supply. There can be 10 string light main bodies connected. Furthermore, neither the brightness nor the power of each light will drop with a voltage drop of a voltage.

2. By use of the controller, the high-voltage WRGB string light can realize the light sensation, timing, overcurrent protection and memory functions. The light sensation and timing module can sense external light rays to automatically turn on and turn off the WRGB bulbs, without manual control, which is more intelligent and energy-saving. The overcurrent protection module can detect a current that passes through the controller, to better protect the controller and avoid damage to the controller due to a short circuit of the string light main body and the like. The memory module can store the running state before power failure of the controller, and can keep the running state before power failure after the controller is re-energized, without re-adjustment, so that the high-voltage WRGB string light is more convenient to use.

Figure 1:
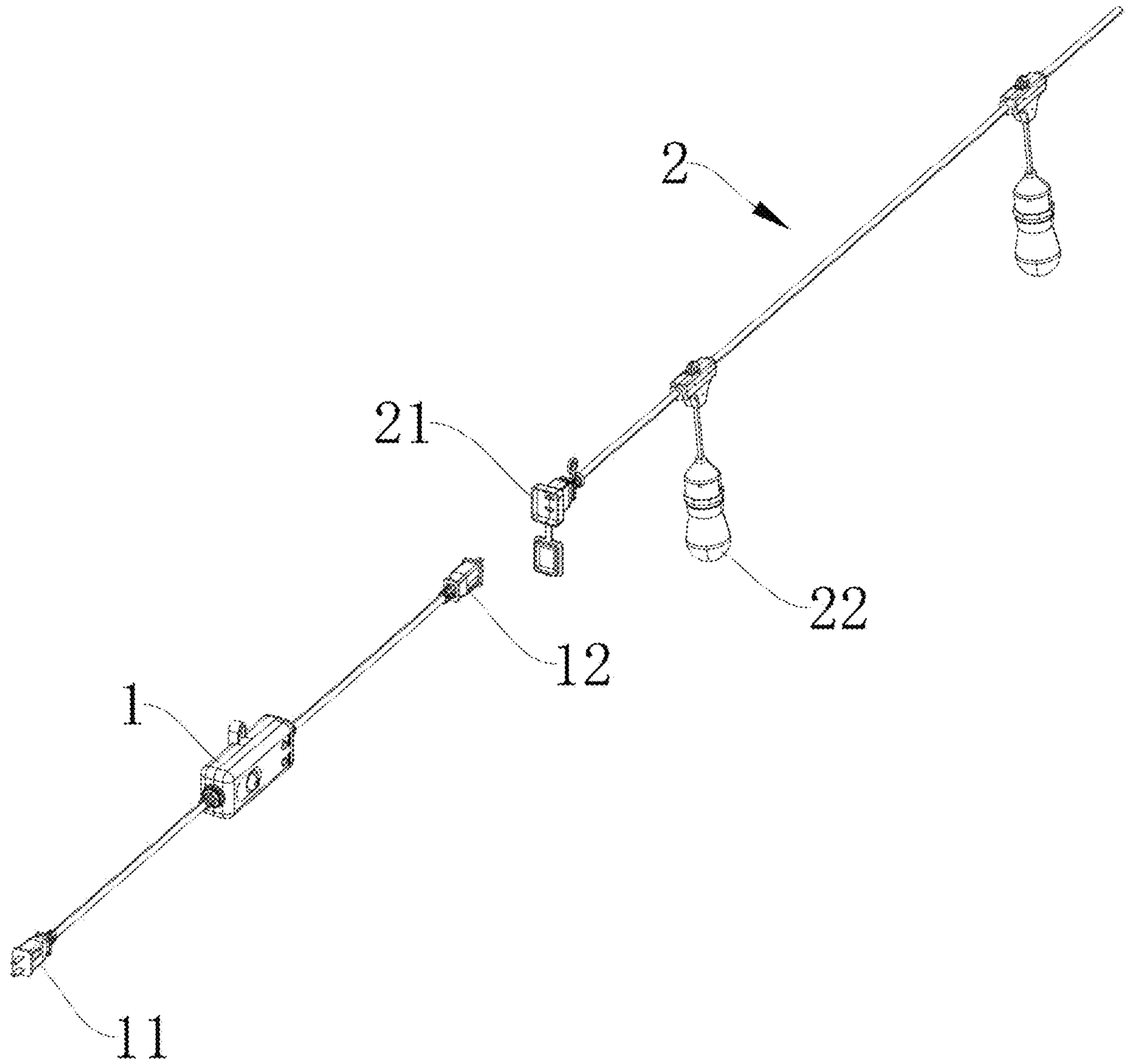
FIG. 1 is a schematic diagram of connection according to one preferred embodiment of the present disclosure.
Figure 2:
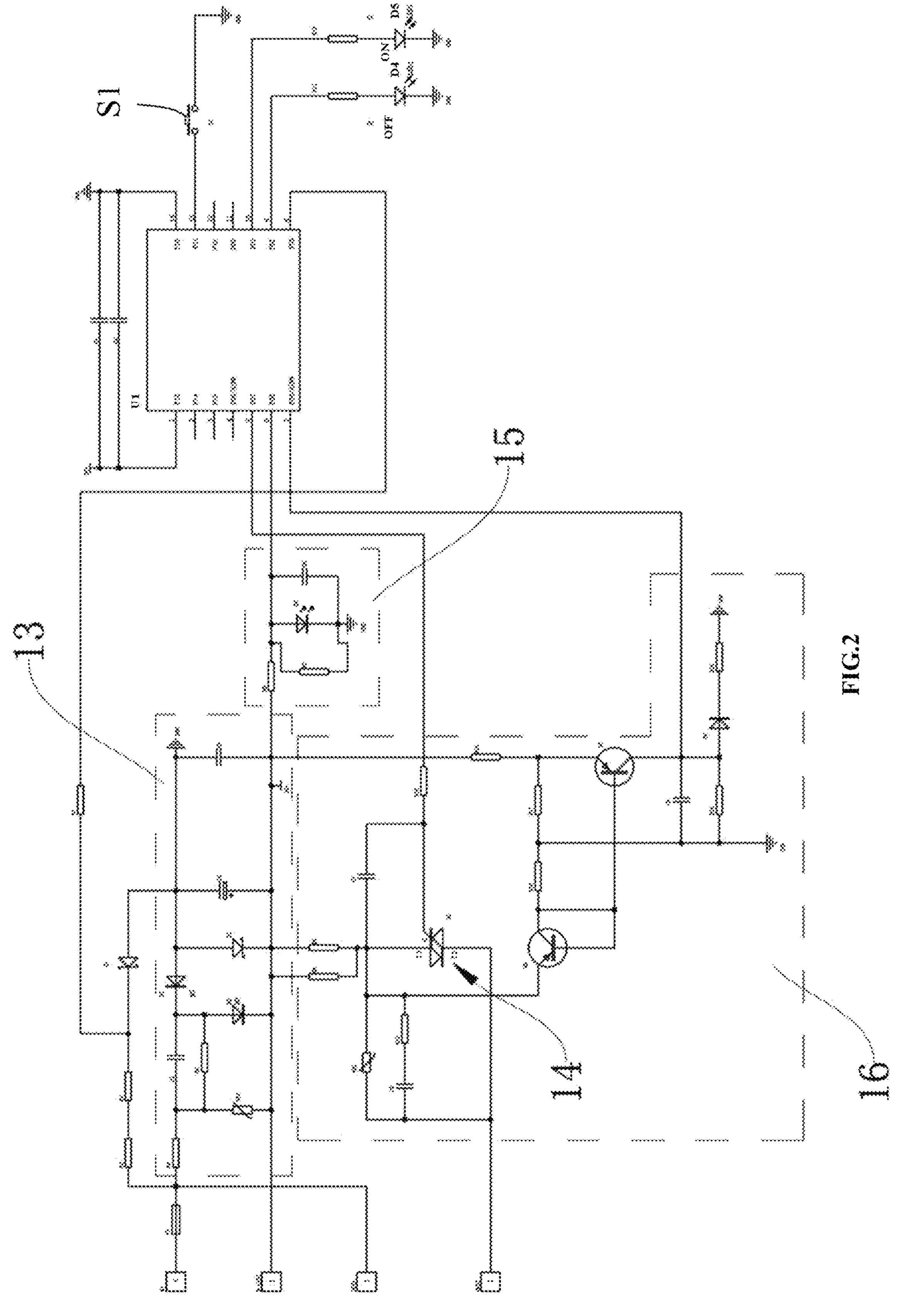
FIG. 2 is a schematic circuit diagram of a controller according to one preferred embodiment of the present disclosure.
Figure 3:
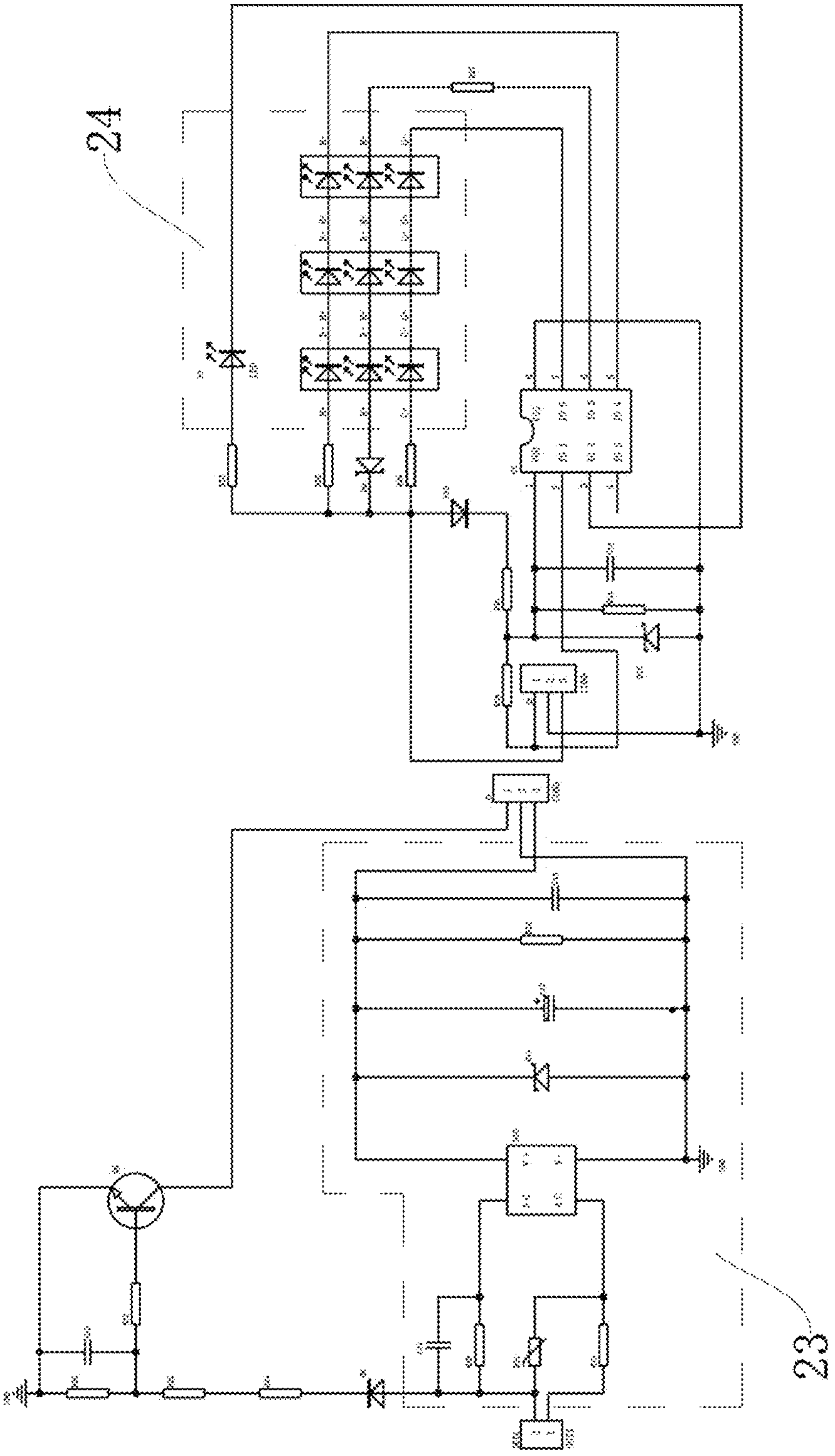
FIG. 3 is a schematic circuit diagram of a WRGB bulb according to one preferred embodiment of the present disclosure.
Figure 4:
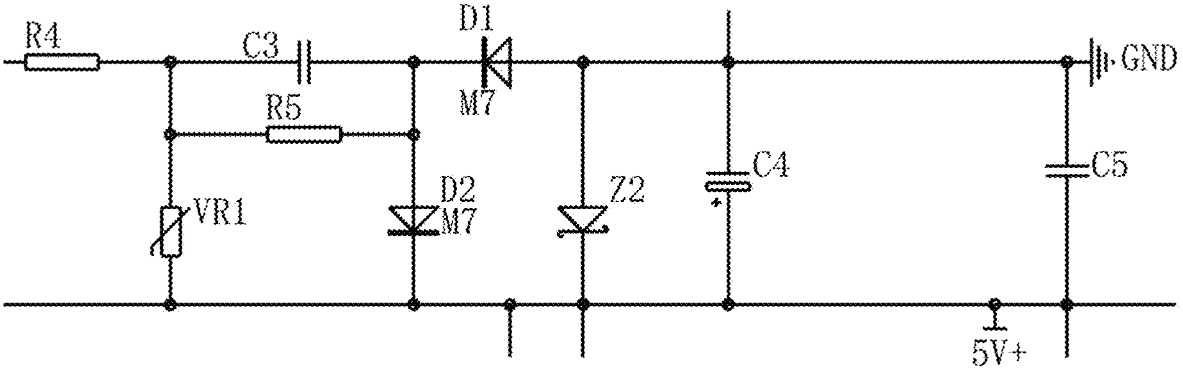
FIG. 4 is a schematic circuit diagram of a first power supply module according to one preferred embodiment of the present disclosure.

In the drawings: 1: controller; 11: first connector; 12: second connector; 13: first power supply module; 14: switch module; 15: light sensation and timing module; 16: protection module; 17: filter circuit; 2: string light main body; 21: third connector; 22: WRGB bulb; 23: second power supply module; and 24: lighting module.

DETAILED DESCRIPTION OF THE EMBODIMENTS

The present disclosure is further described below in combination with specific implementations. It should be noted that the various embodiments or technical features described below can be arbitrarily combined to form new embodiments without conflicts.

In the description of the present disclosure, it should be noted that for orientation terms, orientations or positional relationships indicated by the terms “center”, “transverse”, “longitudinal”, “length” “width”, “thickness”, “upper”, “lower”, “front”, “rear”, “left”, “right”, “vertical”, “horizontal”, “top”, “bottom”, “inside”, “outside”, “clockwise”, “anticlockwise”, and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms cannot construed as limiting the specific protection scope of the present disclosure.

It should be noted that the terms “first”, “second”, etc. in the specification and claims of the present disclosure are used to distinguish similar objects, and do not have to be used to describe a specific order or sequence.

The terms “include” and “have” as well as any of their variations in this specification and claims of the present disclosure are intended to cover non-exclusive inclusions. For example, processes, methods, systems, products, or devices that include a series of steps or units are not necessarily limited to those steps or units clearly listed below, but may include other steps or units that are not clearly listed or are inherent to these processes, methods, products, or devices.

The present disclosure will be further described below in conjunction with the drawings:

As shown in FIG. 1 to FIG. 9, one preferred embodiment of the present disclosure includes a controller 1 and a string light main body 2. The controller 1 and the string light main body 2 are detachably connected to facilitate mounting and storage. The controller 1 is provided with a first connector 11 and a second connector 12. The string light main body 2 is provided with a third connector 21. The first connector 11 is adapted to be connected to a power supply, and the third connector 21 is adapted to be connected to the power supply. The second connector 12 is adapted to be electrically connected to the third connector 21 in a separable manner. The first connector 11, the second connector 12 and the third connector 21 may easily achieve detachable connection by using standard or non-standard end-to-end plugging. Particularly, the controller 1 and the string light main body 2 use the standard end-to-end plugging, the string light main body 2 can be directly connected to the mains supply to serve as an ordinary string light. In this state, there are no synchronization and memory functions. The string light main body 2 can also be connected to the controller 1. In this state, turning on, turning off, and color adjustment, switching and synchronization functions of the string light main body 2 can be realized. The controller 1 can directly operate the string light main body 2 to easily select the functions of the string light main body 2, without worrying that the string light main body 2 cannot be controlled because there is no WIFI network or because the remote controller is lost.

As shown in FIG. 2 to FIG. 5, the string light main body 2 is provided with a plurality of WRGB bulbs 22. The controller 1 includes a first power supply module 13 and a main control module U1. The first power supply module 13 is adapted to be connected to a mains supply to supply power to the main control module U1. The WRGB bulbs 22 include a second power supply module 23, an auxiliary control module U2 and a lighting module 24. The second power supply module 23 is adapted to be connected to the controller 1 or the main supply to supply power to the auxiliary control module U2 and the lighting module 24. The main control module U1 is adapted to send a control signal to the auxiliary control module U2, so that the lighting module 24 is turned on or turned off or switches a color. Due to a double-core design of the first power supply module 13 and the second power supply module 23, the functions of the light can be controlled by using the alternating current mains supply.

A plurality of LEDs are arranged in the lighting module 24. Four LEDs are preferred. The four LEDs correspondingly show four colors: White, Red, Green and Blue separately, to achieve a WRGB color display technology.

The main control module U1 can send a control signal. The control signal sets a code value by using a mains frequency, such as 50 Hz or 60 Hz. Different code values represent different functions. After the control signal is received and decoded by the auxiliary control module U2, various functions can be realized, for example, color switching, light sensation, timing and memory functions of the lighting module 24.

A WRGB string light main body 2 formed by connecting more than five strings is not common. General WRGB string light main bodies 2 are formed by connecting four or fewer strings. The string light main body 2 of the present disclosure can be formed by connecting 10 strings at most. Furthermore, the power and brightness of the lighting modules 24 at the head and the tail can be kept consistent, which avoids such a phenomenon that the brightness at the head is high and the brightness at the tail is low because of a voltage drop of a low-voltage lamp.

A first resistance-capacitance step-down circuit is arranged in the first power supply module 13, and a second resistance-capacitance step-down circuit is arranged in the second power supply module 23. The power and current of the first power supply module 13 after step-down can satisfy the running of the main control module U1, and the power and current of the second power supply module 23 can satisfy the running of the auxiliary control module U2 and the lighting module 24.

Figure 5:
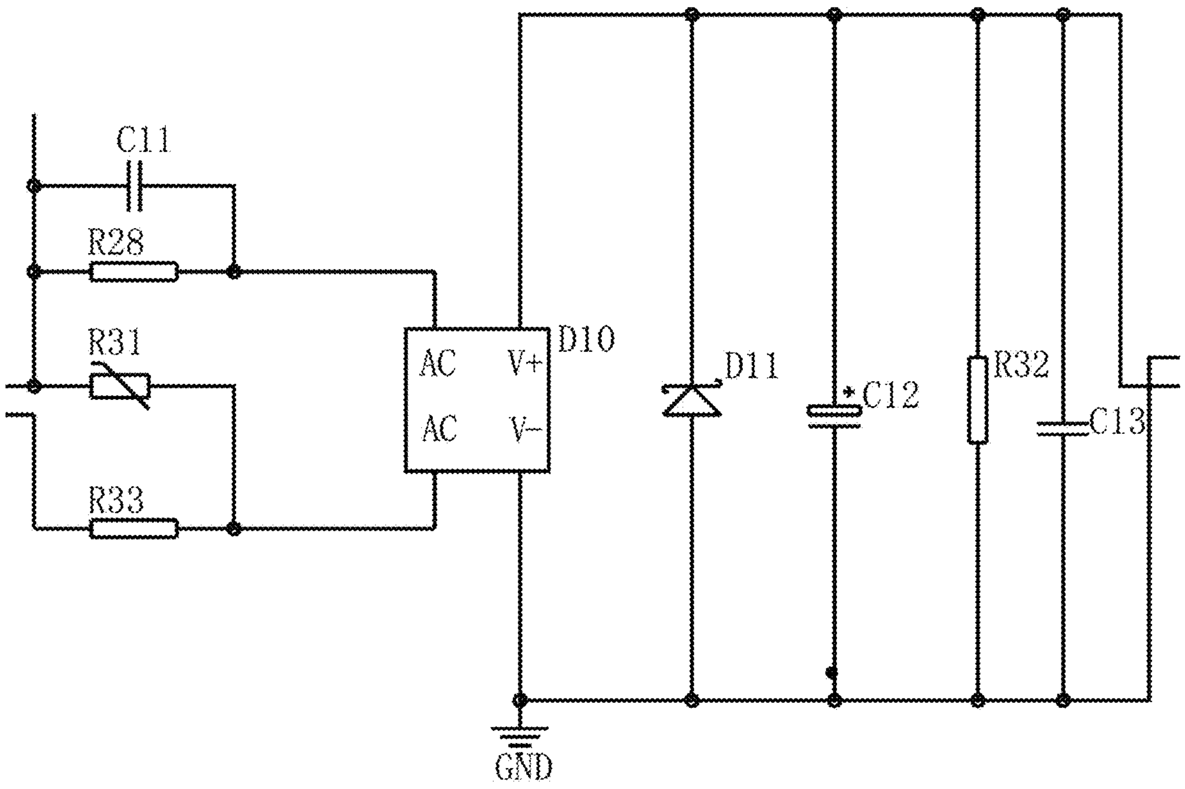
FIG. 5 is a schematic circuit diagram of a second power supply module according to one preferred embodiment of the present disclosure.

As shown in FIG. 5, the second resistance-capacitance step-down circuit is provided with a bridge rectifier D10 for rectification, which can convert the alternating current mains supply into direct current, thus supplying power to the auxiliary control module U2 and the lighting module 24.

Figure 8:
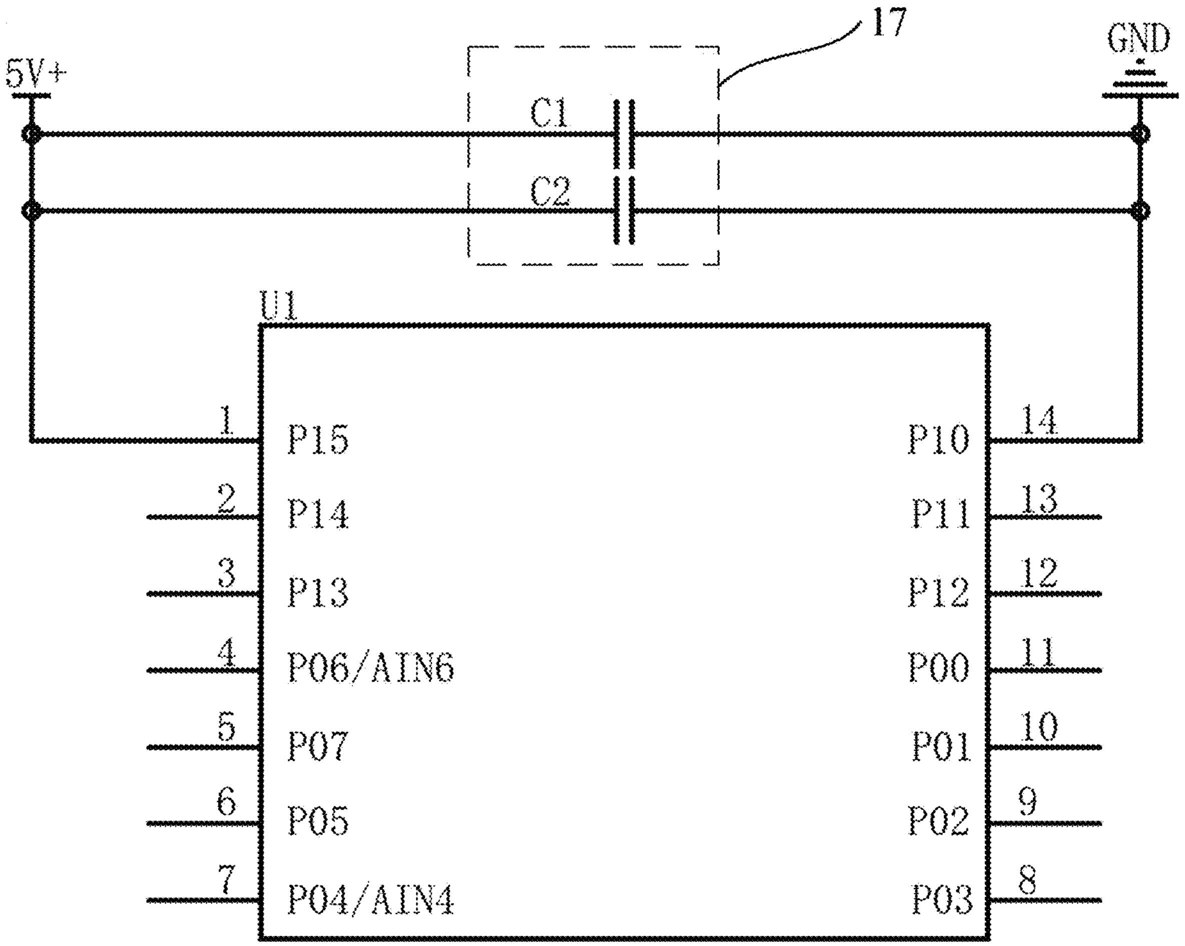
FIG. 8 is a schematic circuit diagram of a main control module according to one preferred embodiment of the present disclosure.

As shown in FIG. 8, the controller 1 is provided with an indicator lamp. The indicator lamp is connected to the main control module U1. The indicator lamp is used for displaying an on/off state of the string light main body 2. The indicator lamp is preferably an LED. There are preferably two indicator lamps: One indicator lamp is an off indicator lamp D4, and one indicator lamp is an on indicator lamp D5, so that a running state of the controller 1 can be visually displayed to facilitate observation.

The main control module U1 is connected in parallel with a filter circuit 17. The filter circuit 17 is composed of a capacitor C1 and a capacitor C2, which can reduce interference, so that the main control module U1 runs more stably.

The main control module U1 is provided with a first control pin P07, a second control pin P11, a detection pin P04, a light sensation pin P05, an indication pin P01 and an indication pin P02. The first control pin P07 is adapted to send the control signal. The controller 1 is provided with a color matching switch S1. The main control module U1 is electrically connected with the color matching switch S1. The second control pin P11 is adapted to receive a signal of the color matching switch S1. The detection pin P04 is adapted to receive a detection signal. The light sensation pin P05 is adapted to receive a light sensation signal. The indication pin P01 and the indication pin P02 are adapted to send indication signals to the on indicator lamp D5 and the off indicator lamp D4.

The number of pin-outs of the main control module U1 and the number of pin-outs of the auxiliary control module U2 may be different. A function definition of each pin-out can also be different, as long as the number of pin-outs can satisfy the use of the above functions.

Figure 7:
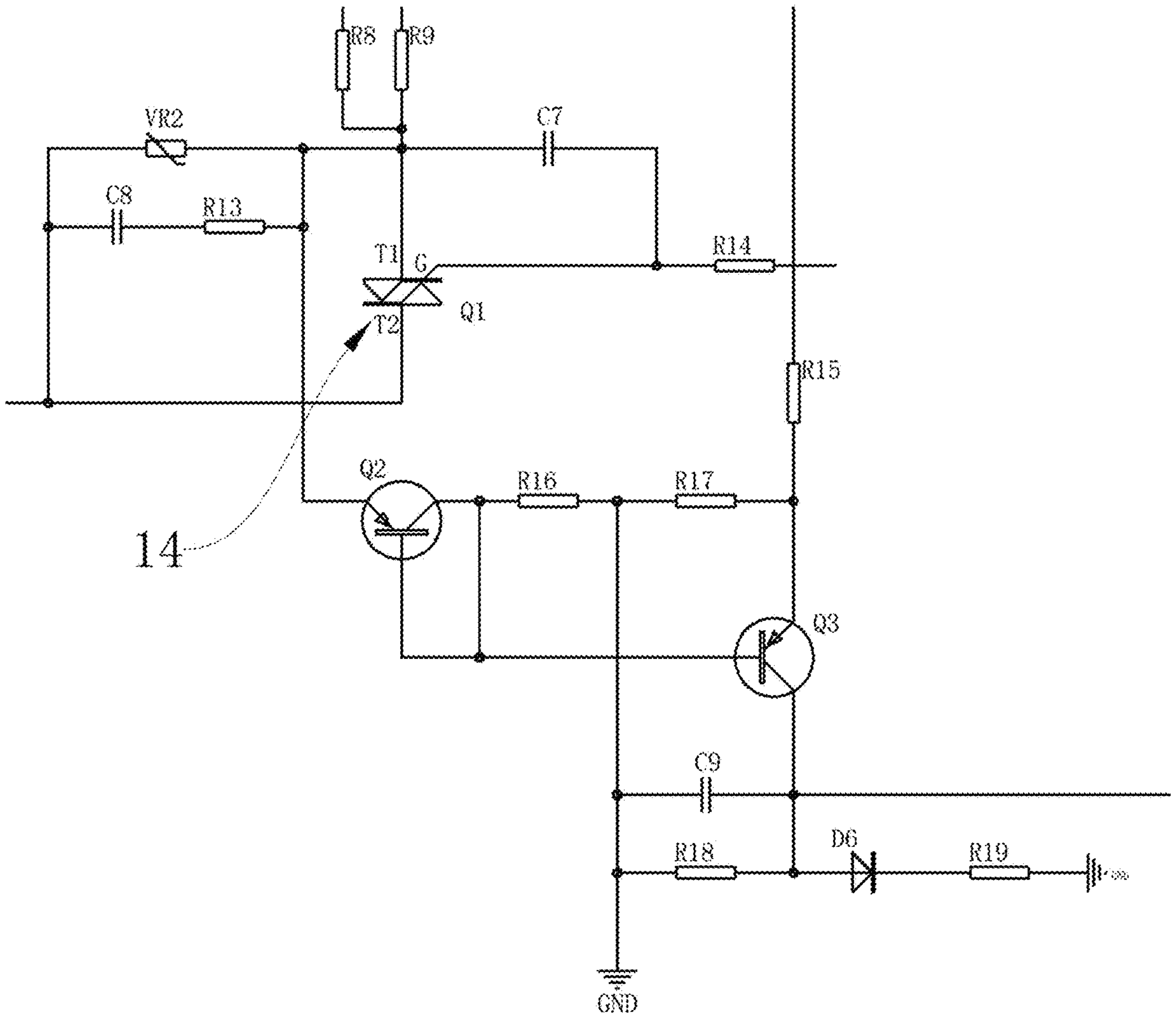
FIG. 7 is a schematic circuit diagram of a protection module according to one preferred embodiment of the present disclosure.

As shown in FIG. 7, the controller 1 also includes a switch module 14. The switch module 14 preferably uses a bidirectional trigger diode Q1. The switch module 14 is connected to the main control module U1, the first power supply module 13 and the second power supply module 23. The switch module 14 can be switched on and switched off according to the control signal sent by the main control module U1. When receiving the control signal, the switch module 14 is adapted to switch off or switch on power supplied by the first power supply module 13 to the second power supply module 23.

Figure 6:
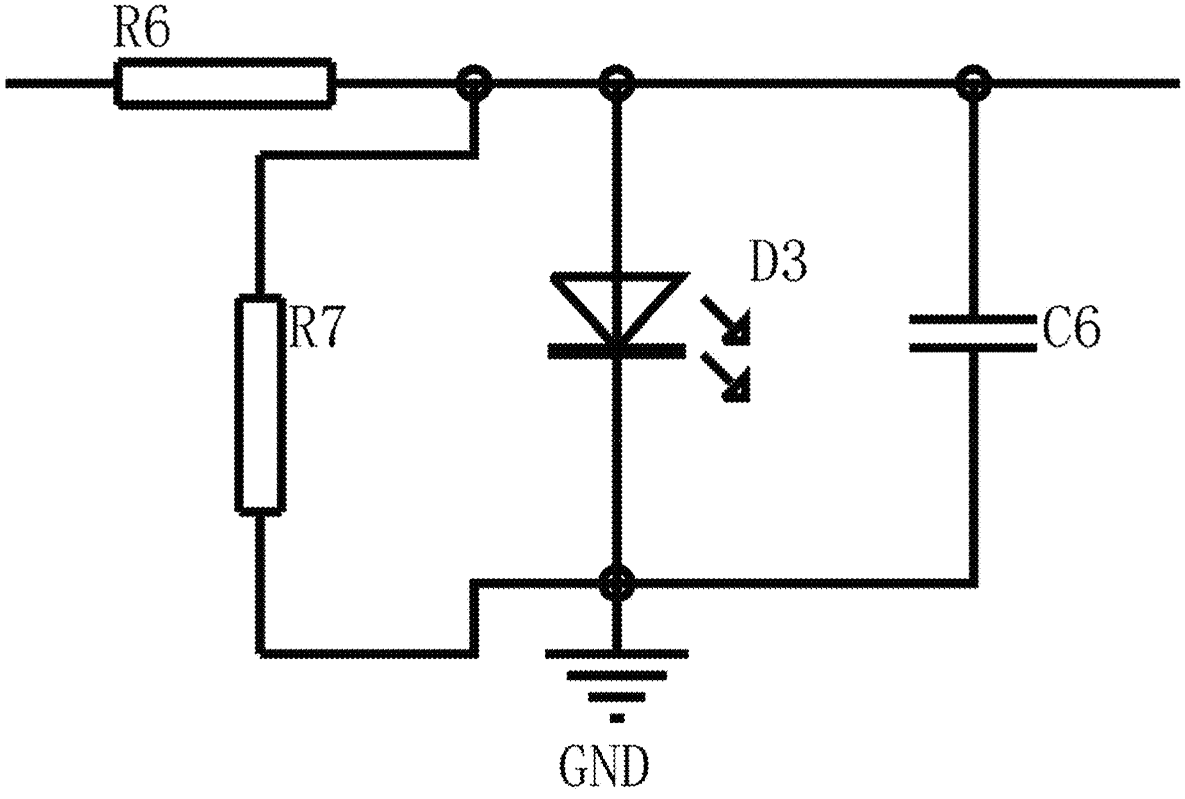
FIG. 6 is a schematic circuit diagram of a light sensation and timing module according to one preferred embodiment of the present disclosure.

As shown in FIG. 6, the controller 1 further includes a light sensation and timing module 15. A photodiode D3 is arranged in the light sensation and timing module 15. The photodiode D3 can generate a current or voltage signal in case of lighting. At this time, the current or voltage signal is a photosensitive signal. The light sensation and timing module 15 is adapted to send the photosensitive signal to the main control module U1 by means of sensing external light rays. The main control module U1 is adapted to receive the photosensitive signal through the light sensation pin P05, and send the control signal instantly or later to the switch module 14 through the first control pin P07, to control the bidirectional trigger diode Q1 to be turned on and turned off, to achieve light sensation control and regular control on the WRGB bulbs 22. The light sensation and timing module 15 is composed of a resistor R6, a resistor R7, the photodiode D3 and a capacitor C6.

As shown in FIG. 7, the controller 1 further includes a protection module 16. The protection module 16 is adapted to identify a current in the first power supply module 13, convert the current into a detection signal, and send the detection signal to the main control module U1. The main control module U1 is adapted to receive and judge the detection signal. The main control module U1 is adapted to send, when the detection signal exceeds a preset value, the control signal to the switch module 14, to control the bidirectional trigger diode Q1 to be turned on and turned off, to power off the second power supply module 23, thereby turning off the WRGB bulbs 22.

The protection module 16 includes a conversion circuit and a detection circuit. The detection signal includes a level signal. The conversion circuit is adapted to obtain the current of the first power supply module 13 and convert the current into a voltage. The detection circuit is adapted to obtain the voltage at the conversion circuit, convert the voltage into the level signal, and send the level signal to the main control module U1. The main control module U1 is adapted to receive the level signal and judge a magnitude of the level signal.

The conversion circuit includes a first conversion resistor R8 and a second conversion resistor R9. The first conversion resistor R8 and the second conversion resistor R9 are connected in parallel to the first power supply module 13. The detection circuit is adapted to obtain voltages at both ends of the first conversion resistor R8 and the second conversion resistor R9.

The protection module 16 can detect currents flowing through the first conversion resistor R8 and the second conversion resistor R9. When the currents reach a certain value, the voltages at both ends of the first conversion resistor R8 and the second conversion resistor R9 will reach a threshold. Then, the detection circuit composed of a resistor R15, a resistor R16, a resistor R17, a triode Q2, a triode Q3, a capacitor C9, a resistor R18, a unidirectional diode D6 and a resistor R19 sends a voltage value to the detection pin P04, and the main control module U1 judges a size of a level, so as to send a corresponding control signal to control the bidirectional trigger diode Q1 to be turned on and turned off, to realize overcurrent protection.

The main control module U1 is provided with a memory module. The memory module is achieved by setting a program in the main control module U1. The memory module is adapted to store a running state before power failure of the main control module U1. The memory module is adapted to restore, after re-energization, the main control module U1 to the running state before power failure.

Figure 9:
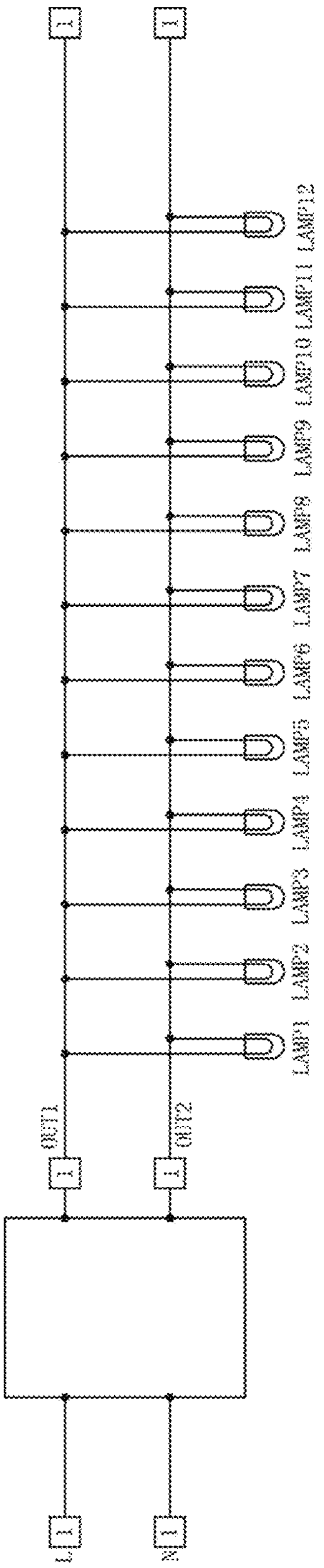
FIG. 9 is a schematic diagram of connection between a controller and a WRGB bulb according to one preferred embodiment of the present disclosure.

As shown in FIG. 9, two wires OUT1 and OUT2 are connected to the controller 1 of the present disclosure as positive and negative electrodes of the WRGB bulbs 22. The plurality of WRGB bulbs 22 are connected in parallel to the two wires OUT1 and OUT2 to achieve energization.

In another preferred embodiment of the present disclosure, the first power supply module 13 and the second power supply module 23 are powered by constant current circuits. The WRGB bulbs 22 run more stably, do not fluctuate easily, are not easily faulted and damaged, and have no stroboflash.

The above describes the basic principle, main characteristics and advantages of the present disclosure. Those skilled in the art should understand that the present disclosure is not limited by the foregoing embodiments. The foregoing embodiments and the description in the specification only illustrate the principles of the present disclosure. The present disclosure may have various changes and improvements without departing from the spirit and scope of the present disclosure, and these changes and improvements all fall within the claimed scope of the present disclosure. The claimed scope of the present disclosure is defined by the appended claims and their equivalents.

What is claimed is:

1. A high-pressure white-red-green-blue (WRGB) string light, comprising a controller and a string light main body, wherein the controller is connected with the string light main body; the string light main body is provided with a plurality of WRGB bulbs;

the controller comprises a first power supply module and a main control module; wherein the first power supply module is adapted to be connected to a mains supply to supply power to the main control module;

the WRGB bulbs comprise a second power supply module, an auxiliary control module and a lighting module; wherein the second power supply module is adapted to be connected to the controller or the main supply to supply power to the auxiliary control module and the lighting module; and the main control module is adapted to send a control signal to the auxiliary control module, so that the lighting module is turned on or turned off or switches a color;

the controller is provided with a first connector and a second connector; the string light main body is provided with a third connector; the first connector is adapted to be connected to a power supply; the third connector is adapted to be connected to the power supply; the second connector is adapted to be electrically connected to the third connector in a separable manner;

the controller is provided with an indicator lamp; the indicator lamp is used for displaying an on/off state of the string light main body;

the main control module is connected in parallel with a filter circuit;

the main control module is provided with a first control pin, a second control pin, a detection pin, a light sensation pin and an indication pin; the first control pin is adapted to send the control signal; the main control module is connected with a color matching switch; the second control pin is adapted to receive a signal of the color matching switch; the detection pin is adapted to receive a detection signal; the light sensation pin is adapted to receive a light sensation signal; and the indication pin is adapted to send an indication signal to the indicator lamp.

2. The high-pressure WRGB string light according to claim 1, wherein the controller further comprises a light sensation and timing module; the light sensation and timing module is adapted to send a light sensation signal to the main control module by means of sensing an external light ray; and the main control module is adapted to receive the light sensation signal, and send the control signal instantly or later to turn on or turn off the WRGB bulbs.

3. The high-pressure WRGB string light according to claim 1, wherein the controller further comprises a protection module; the protection module is adapted to identify a current in the first power supply module, convert the current into a detection signal, and send the detection signal to the main control module; the main control module is adapted to receive and judge the detection signal; and the main control module is adapted to send, when the detection signal exceeds a preset value, the control signal to turn off the WRGB bulbs.

4. The high-pressure WRGB string light according to claim 3, wherein the protection module comprises a conversion circuit and a detection circuit; the detection signal comprises a level signal; the conversion circuit is adapted to obtain the current of the first power supply module and convert the current into a voltage; the detection circuit is adapted to obtain the voltage at the conversion circuit, convert the voltage into the level signal, and send the level signal to the main control module; and the main control module is adapted to receive the level signal and judge a magnitude of the level signal.

5. The high-pressure WRGB string light according to claim 4, wherein the conversion circuit comprises a first conversion resistor and a second conversion resistor; the first conversion resistor and the second conversion resistor are connected in parallel to the first power supply module; and the detection circuit is adapted to obtain voltages at both ends of the first conversion resistor and the second conversion resistor.

6. The high-pressure WRGB string light according to claim 1, wherein the controller further comprises a switch module; the switch module is connected to the main control module, the first power supply module and the second power supply module; and when receiving the control signal, the switch module is adapted to switch off or switch on power supplied by the first power supply module to the second power supply module.

7. The high-pressure WRGB string light according to claim 1, wherein a memory module is arranged on the main control module; the memory module is adapted to store a running state before power failure of the main control module; and the memory module is adapted to restore, after re-energization, the main control module to the running state before power failure.

8. The high-pressure WRGB string light according to claim 1, wherein a first resistance-capacitance step-down circuit is arranged in the first power supply module; a second resistance-capacitance step-down circuit is arranged in the second power supply module; and the second resistance-capacitance step-down circuit is provided with a bridge rectifier for rectification.

9. The high-pressure WRGB string light according to claim 1, wherein constant current circuits are arranged in the first power supply module and the second power supply module.

* * * * *